Patented Sept. 20, 1949

2,482,084

UNITED STATES PATENT OFFICE 2,482,084

ALKYLATING THIOPHENE WITH SULFURIC ACID CATALYST

Philip D. Caesar and Pharez G. Waldo, Wenonah, N. J., assignors to Socony-Vacuum Oil Company, Incorporated, a corporation of New York No Drawing. Application February 23, 1946, Serial No. 649,728

11 Claims. (Cl. 260—329)

This invention relates to the alkylation of thiophene and alkyl thiophenes and, more particularly, to the alkylation of thiophene and alkyl thiophenes in the presence of catalytic material comprising sulfuric acid.

Alkylation reactions are well known in the art and connote the union between alkyl radicals and molecules of organic compounds under conditions of temperature, pressure, and time ordinarily referred to in the art as alkylating conditions. The compounds thus produced are called alkymers and represent, structurally, the addition of the original alkyl radical to the organic compound molecule. The product of an alkylation reaction is broadly referred to in the art as an alkylate and ordinarily contains the alkymer, residual amounts of reactants, and products of secondary reactions that occur concurrently with the alkylation reaction.

Generally speaking, the temperature and to a certain extent, the pressure and time of reaction employed in alkylation operations depend upon whether the alkylation is effected in the absence (when at all possible), or presence of alkylation catalysts. The two methods are generally referred to as thermal and catalytic alkylation, respectively.

In alkylation reactions, the alkyl radical may be furnished by a variety of substances accordingly known in the art as alkylating agents. Olefinic hydrocarbons, alkyl halides, alcohols, aralkyl halides, and less frequently, organic and inorganic esters, ethers, alkyl sulfates, alkene oxides and mercaptans have been proposed as alkylating agents.

As is well known to those familiar with the art, the synthesis of the homologues of thiophene has been effected mostly through the Wurtz reaction, i. e., by condensing the iodo-derivatives of thiophene with iodo- or bromo-alkyls in the presence of metallic sodium. However, the yields of thiophene homologues have been always small and the cost of the reagents involved have limited somewhat the commercial utilization of this synthesis. The Friedel-Crafts synthesis has also been proposed for preparing thiophene homologues, i. e., the condensation of thiophene and halogen alkyls in the presence of aluminum chloride. This reaction although applicable with considerable success in the alkylation of aromatic hydrocarbons is only moderately successful where thiophene is involved. This appears to be due to the relative instability of the thiophene ring, the aluminum chloride attacking the sulfur and causing many undesirable secondary reactions with concomitantly low yields of alkyl thiophenes.

The alkylation of thiophene has been an exceedingly difficult reaction to carry out with good yields of desired product. The usual alkylation catalysts such as aluminum halides, sulfuric acid in the usual concentration and hydrogen fluoride all cause excessive resinification of the thiophene reactant. The resinification usually occurs before alkylation can be effected, and if the expected reaction product is formed, it is only in very small amounts.

It has now been discovered that the homologues of thiophene may be obtained in an efficient manner by reacting thiophene or alkyl thiophenes with alkylating agents in the presence of sulfuric acid of controlled concentration.

Accordingly, it is an object of this invention to alkylate thiophene and alkyl thiophenes with alkylating agents in the presence of sulfuric acid of about 98 per cent concentration. It is another object of the present invention to alkylate thiophene and alkyl thiophenes with alkylating agents in the presence of alkyl sulfates. It is a further object to alkylate thiophene and alkyl thiophenes with alkylating agents in the presence of sulfuric acid of about 98 per cent concentration or in the presence of aliphatic sulfates at temperatures up to about 300 degrees centigrade. The present invention also has as an object alkylation of thiophene and alkyl thiophenes with alkylating agents in the presence of sulfuric acid of from about 45 per cent to about 98 per cent concentration or in the presence of aliphatic sulfates at temperatures of about zero degrees centigrade to about 300 degrees centigrade. Other objects and advantages will become apparent from the following description.

Although it has been suggested that thiophene is similar to benzene in some respects, it will be shown that in the alkylation reaction when 70 per cent to 98 per cent sulfuric acid is used as the catalyst thiophene does not react in a manner similar to benzene.

Ipatieff, Corson, and Pines, J. A. C. S. 58, 919 (1936) alkylated benzene at 0–20 degrees centigrade by passing a gaseous stream of isobutylene into a stirred mixture of approximately equal weights of benzene and sulfuric acid. They drew the following conclusions:

1. Using 90–98 per cent sulfuric acid, the rate of alkylation of benzene with isobutylene far exceeds the rates of side reactions.

2. Using 80 per cent sulfuric acid, the rate of polymerization of the isobutylene exceeds the rate of alkylation, etc.

3. Using 70 per cent sulfuric acid, the esterification and subsequent hydrolysis of the isobutylene is the predominant reaction.

Employing similar conditions and technique to effect the alkylation of thiophene with isobutylene (see Table I), it is possible to make the following observations:

1. Using 85-98 per cent sulfuric acid, the rate of resinification of the thiophene far exceeds the rate of alkylation.

2. Using 80 per cent sulfuric acid, the rate of alkylation far exceeds all other reactions.

3. Using 70 per cent sulfuric acid, the esterification and subsequent hydrolysis of the isobutylene is the predominant reaction.

the conversion of thiophene to alkyl thiophene is substantially independent of the amount of acid employed as catalyst (see Examples 2 and 9, Table II). Furthermore, at a mole ratio of alkylating agent to sulfuric acid of about 1.4, temperature of the reaction has substantially no effect upon the amount of alkyl thiophene which is produced (see Examples 1, 2, Table II), whereas at a mole ratio of alkylating agent to sulfuric acid of about 9-10 to 1 an increase in temperature is accompanied by an increased production of alkylated thiophene (see examples 8 and 9, Table II). However, when using 75 per cent sulfuric acid an increase in temperature brings about an increase in production of alkylated thiophene (see Examples 3 and 4, Table II). Before ending a discussion of Table II, it is most im-

TABLE I

*Effect of $H_2SO_4$ concentration on the alkylation of thiophene with isobutylene temperature range = $-10°$ C. to $+20°$ C.*

| Run No. | Thiophene, gms. | Isobutylene, gms. | $H_2SO_4$ per cent concentration | $H_2SO_4$, gms. | Reaction Time, minutes | Reaction Temp., °C. | Cut Boiling 140-190° C. (Alkyl Thiophenes) | |
|---|---|---|---|---|---|---|---|---|
| | | | | | | | Per cent (by wt. charge) | Sp. Gr. |
| 1 | 42 | | 96 | 42 | 0-5 | -5 up | Solid black resin | |
| 2 | 42 | 26 | 90 | 42 | 60 | -10 | 10 | 0.910 |
| 3 | 42 | 26 | 85 | 42 | 60 | -5 | 7 | 0.945 |
| 4 | 42 | 29 | 80 | 42 | 60 | 5-10 | 54 | 0.940 |
| 5 | 42 | 23 | 75 | 42 | 60 | 10-15 | 15 | 0.945 |
| 6 | 45 | 35 | 70 | 45 | 60 | 15-20 | none | |

According to these results, thiophene appears to be analogous to olefins in some of its chemical properties. It might even be said that thiophene forms codimers with the isobutylene under conditions which would cause polymerization of the isobutylene if no thiophene were present.

The effect of temperature seems to be dependent upon the amount and concentration of sulfuric acid employed as catalyst. Thus, for example, using 80 per cent sulfuric acid and a temperature of about 5 to about 10 degrees centigrade the amount of thiophene converted to alkyl thiophene using a substantially constant amount of alkylating agent varies with the amount of sulfuric acid (see Examples 1 and 8, Table II). On the other hand, with substantially constant amounts of thiophene and alkylating agent, a temperature of about 55 to about 60 degrees centigrade and 80 per cent sulfuric portant to point out that with conditions under which thiophene reacts very readily to give a good yield of alkylated thiophene, benzene alkylates only to a minor extent, say less than 10 per cent, the primary products being unreacted benzene and polymers of the alkylating agent, isobutylene. The recoveries are expressed in Table II as per cent by weight of charge rather than per cent theoretical based on thiophene, because there are two main products, mono- and di-alkyl thiophene.

TABLE II

*Effect of temperature on the alkylation of thiophene catalyzed by 50-80% $H_2SO_4$*

| Run No. | Thiophene, gms. | Isobutylene, gms. | $H_2SO_4$ Per-Cent concentration | $H_2SO_4$, gms. | Reaction Time, minutes | Reaction Temp., °C. | Cut Boiling 140-190° C. (Alkyl thiophenes) | |
|---|---|---|---|---|---|---|---|---|
| | | | | | | | Per Cent (by wt. charge) | Sp. Gr. |
| 1 | 42 | 29 | 80 | 42 | 60 | 5-10 | 54 | 0.940 |
| 2 | 42 | 24 | 80 | 42 | 60 | 55-60 | 46 | 0.936 |
| 3 | 42 | 23 | 75 | 42 | 60 | 10-15 | 15 | 0.945 |
| 4 | 42 | 26 | 75 | 42 | 60 | 60-70 | 62 | 0.945 |
| 5 | 42 | 24 | 70 | 42 | 60 | 70-80 | 53 | 0.945 |
| 6 | 42 | ¹35 | 60 | 42 | 60 | 150 | 29 | 0.928 |
| 7 | 42 | ¹35 | 50 | 42 | 60 | 200 | 16 | 0.930 |
| 8 | 42 | 28 | 80 | 6 | 60 | 5-10 | 24 | 0.946 |
| 9 | 42 | 26 | 80 | 6 | 60 | 55-60 | 52 | 0.945 |
| 10 | ²40 | 24 | 80 | 40 | 60 | 55-65 | ³33 | 0.810 |

¹ t-$C_8H_{16}$.
² Benzene.
³ Butylene Polymers, predominantly. Specific gravity of t-butylbenzene is 0.867.

Further conclusions can be derived from the data shown in Table II.

1. At such elevated temperatures high conversions per pass of alkyl thiophene are obtained using smaller quantities of sulfuric acid of a given concentration than would catalyze the reaction at 0-20 degrees centigrade.

2. At such elevated temperatures high conversions per pass of alkyl thiophenes are obtained using concentrations of sulfuric acid that at 0–20 degrees centigrade would cause olefin esterification, predominantly.

3. Under reaction conditions similar to those used in thiophene alkylation there is no noticeable effect of temperature over a range of 0–65 degrees centigrade on the alkylation of benzene with easily polymerized olefins such as isobutylene, catalyzed by sulfuric acid of 80 per cent concentration or lower. Substantially no alkyl benzenes are formed throughout.

The results tabulated in Table II were obtained by carrying out the alkylation in the manner described in Example I for low temperature alkylations below the reflux temperature of thiophene and as described in Example II for reactions at temperatures above the reflux temperature of thiophene.

EXAMPLE I

To a well agitated mixture of 42 grams (0.5 mole) of thiophene and 42 grams of 75 per cent sulfuric acid (0.322 mole) were added 26 grams (0.46 mole) of gaseous isobutylene in the course of about one hour. The temperature was kept between about 60 and 70 degrees centigrade throughout the run. After the run was completed, the two layers were allowed to separate and the acid bottom layer removed. The upper layer was water-washed and distilled over a one-plate column to an endpoint of 190 degrees centigrade. Most of the dibutyl thiophene was left in the pot. The relatively low density of the residue indicated that very little thiophene resin was formed.

EXAMPLE II

In a 500 cubic centimeter steel autoclave equipped with a stirrer and heating bath, 42 grams (0.5 mole) of thiophene, 35 grams (0.5 mole) of isoamylene and 42 grams (0.257 mole) of 60 per cent sulfuric acid was stirred for one hour at 150 degrees centigrade. The product was water-washed and distilled, as described in Example I.

Examples III and IV describe the alkylation of thiophene with propylene and di-isobutylene, respectively. The former is an example of straight chain, relatively unreactive olefins and the latter is an example of olefins that depolymerize before alkylation. Practical olefin limitations would range from propylene to dodecenes with such higher olefins as triisoamylene and hexadecene-1 included.

EXAMPLE III

To a well agitated mixture of 45 grams (0.53 mole) of thiophene and 45 grams of 80 per cent sulfuric acid were added 15–20 grams (0.36–0.48 mole) of propylene in the course of thirty minutes. The temperature was kept between 55 and 60 degrees centigrade throughout the run. After the run was completed, the two layers were allowed to separate and the acid bottom layer removed. The upper layer was washed a number of times with water. Bad emulsions caused the loss of much of the product. Distillation of the washed recovery over a one-plate column isolated 5 grams of a liquid boiling from 140–155 degrees centigrade. Isopropyl thiophene boils at 152–153 degrees centigrade. The specific gravity of this material was approximately 0.98. The specific gravity of pure isopropyl thiophene is 0.9674. The sulfur analysis of this product was 21.95 per cent. The theoretical percentage of sulfur in isopropyl thiophene is 25.4 per cent.

EXAMPLE IV

To a well agitated mixture of 42 grams (0.5 mole) of thiophene and 42 grams of 75 per cent sulfuric acid (0.32 mole) were added 56 grams (0.5 mole) of di-isobutylene in the course of one hour. The run was continued for another hour. The temperature was kept between 70 and 75 degrees centigrade throughout the run. After the run was completed, the two layers were allowed to separate and the acid bottom layer removed. The upper layer formed a bad emulsion when washed with 10 per cent potassium hydroxide solution. Neither concentrated hydrochloric acid or isopropyl alcohol alone would break it up completely. Repeated washing with hot water finally broke the emulsion. The following cuts were taken over a one-plate column:

| | | |
|---|---|---|
| 70–140° C. | 22 grams | Thiophene |
| 140–220° C. | 5 grams | |
| 220–240° C.[1] | 45 grams | Dibutyl thiophene (Sp. Gr.=0.937) |
| Residue | 12 grams | |

[1] This cut consists of 85–90 per cent dibutyl thiophenes.

It has been found, too, that thiophene can be alkylated with olefins in the presence of 96 per cent sulfuric acid without excessive resinification by completely revising the alkylation technique previously described herein. These alterations are described in Examples V to X. The results, using isoamylene and octene-1 as alkylating agents, are shown in Tables III and IV, respectively. The fact that thiophene can be alkylated with octene-1 in the presence of concentrated sulfuric acid with a greatly reduced resin loss by adding the acid to the olefin before adding the mixture to the thiophene (see Example IX) is new to the art.

EXAMPLE V

To a well agitated mixture of 42 grams (0.5 mole) of thiophene and 140 grams (2 moles) of mixed amylenes were added 45 grams of 96 per cent sulfuric acid (0.44 mole) in the course of 1.25 hours. The temperature was kept between −5 and +5 degrees centigrade throughout the run. The product was separated from the acid, washed, and distilled as previously described. The yield of diamylthiophene was about 30 per cent of the theoretical. No resin was formed.

EXAMPLE VI

To a well agitated mixture of 5 grams (0.06 mole) of thiophene and 22 grams (0.25 mole) of n-hexane were added 5 grams of 96 per cent sulfuric acid (0.05 mole). Reaction time was 15 minutes. The reaction temperature was −10 to +10 degrees centigrade. About 3 grams of solid thiophene resin was formed.

EXAMPLE VII

To a well agitated mixture of 42 grams (0.5 mole) of thiophene and 56 grams of octene-1 were added 15 grams of 96 per cent sulfuric acid (0.147 mole) at 0–10 degrees centigrade in the course of 15–30 minutes. After the acid addition, the mixture was heated to 100 degrees centigrade and stirred for 5 hours. The recovery was washed with water, boiled thirty minutes with 10 per cent potassium hydroxide solution, again water washed, and extracted with 40 cubic centimeters petrohol, 40 cubic centimeters water and 100 cubic centimeters petroleum ether. This procedure was used in an effort to rid recovery of all sulfates of the olefin. The recovery was then topped to approximately 150 degrees centigrade in a side-arm flask and the bottoms distilled under reduced pressures. Recovered 24 grams (specific gravity=0.922) of octyl- and, possibly, dioctylthiophenes boiling from 60–130 degrees centigrade at 1 millimeter mercury. Also recovered 18 grams of resinous residue. In addition, about 10 grams of resinous sludge was formed in the reactor during the run.

EXAMPLE VIII

To a well agitated mixture of 42 grams (0.5 mole) of thiophene and 40 grams (0.57 mole) of isoamylene were added slowly 3.5 grams of 96 per cent sulfuric acid (0.034 mole) at 25–30 degrees centigrade. The reaction proceeded violently and had to be cooled constantly with a Dry Ice-acetone bath. After addition of the acid, the reaction temperature was held between 35–40 degrees centigrade for 5 minutes. The recovery was washed as in the previous example and distilled over a one-plate column. The 150–200 degrees centigrade cut was refractionated on an 8-plate column. It was found that such a cut with a specific gravity of 0.904 consisted of 25 per cent olefin polymers, 50 per cent amylthiophene, and 25 per cent diamylthiophene.

EXAMPLE IX

To 56 grams (0.5 mole) of octene-1 were added slowly 15 grams of 96 per cent sulfuric acid (0.147 mole) at 0–10 degrees centigrade. When the acid was completely in solution, having formed sulfates with the octene-1, presumably, 42 grams (0.5 mole) of thiophene were added and the reaction run for 5 hours at 100 degrees centigrade. The recovery was washed, extracted, and distilled as in Example VII. Recovered 42 grams (specific gravity=0.920) of octyl- and, possibly, dioctylthiophenes boiling from 60–130 degrees centigrade at 1 millimeter mercury. Also recovered 15 grams of viscous, oily, benzene soluble residue. No resinous material was formed.

EXAMPLE X

To 40 grams (0.57 mole) of isoamylene were added slowly 3.5 grams of 96 per cent sulfuric acid (0.034 mole) at 25–30 degrees centigrade. If added at lower temperatures the acid either did not dissolve or built up an excess and then reacted too violently to control. After the reaction had subsided, two layers were still apparent. To this mixture were added 42 grams (0.5 mole) of thiophene. The reaction was then run for 5 minutes at 35–40 degrees centigrade. The recovery was washed and distilled as in the preceding example. It consisted chiefly of thiophene resins and olefin polymers (see Table III).

TABLE III

Alkylation of thiophene with isoamylene catalyzed by sulfuric acid

| Run No. | Thiophene, gms. | Isoamylene, gms. | 96% $H_2SO_4$, gms. | Reaction Time, minutes | Reaction Temp., °C. | Amylthiophene 180–190° C. (Approx.) Per cent (by wt. charge) | Diamylthiophene 70–100° C. at 1 mm. Hg. | | Resin Per cent (by wt. charge) |
|---|---|---|---|---|---|---|---|---|---|
| | | | | | | | Per cent (by wt. charge) | Sp. Gr. | |
| 1 | 42 | 40 | 15 | 120 | 30–35 | 0–5 | 72 | 0.929 | none |
| 2 | 42 | 40 | 7 | 5 | 25 | 0–5 | 67 | 0.929 | none |
| 3 | 42 | 40 | 3.5 | 5 | 35–40 | 18 | 48 | 0.925 | none |
| 4 | 42 | 80 | 3.5 | 5 | 40–50 | 5 | 56 | 0.917 | none |
| 5 | 10 | 70 | 3.5 | 5 | 35–40 | 0 | 15 | | none |
| 6 | 42 | 40 | 1.8 | 5 | 25–30 | | 10 | | none |
| 7 | 42 | 40 | 1.8 | 40 | 35–40 | 12 | 49 | 0.926 | none |
| 8 | 42 | 40 | 1.8 | 7 | 50–60 | 11 | 49 | 0.918 | none |
| 9 | 42 | 40 | ¹15 | 120 | 35–40 | 0 | 0 | | 40–50 |
| 10 | 42 | 40 | ¹3.5 | 5 | 35–40 | 0 | 0 | | 15 |

¹ Acid added to olefin prior to thiophene addition.

TABLE IV

Alkylation of thiophene with octene-1 catalyzed by sulfuric acid

| Run No. | Thiophene, gms. | Octene-1, gms. | 96% $H_2SO_4$ gms. | Acid Addition | Reaction Time, minutes | Reaction Temp., °C. | Octylthiophenes 60–130° C. at 1 mm. Hg | | Benzene Soluble Residue Percent (by wt. charge) | Resinous Sludge Percent (by wt. charge) |
|---|---|---|---|---|---|---|---|---|---|---|
| | | | | | | | Percent (by wt. charge) | Sp. Gr. | | |
| 1 | 42 | 56 | 7 | to olefin | 300 | 100 | (30% (by wt. charge)) | | none | none |
| 2 | 42 | 56 | 15 | do | 300 | 100 | 42 | 0.92 | 15 | none |
| 3 | 42 | 56 | 15 | do | 30 | 100 | 27 | 0.92 | 11 | none |
| 4 | 42 | 56 | 15 | do | 5 | 100 | 19 | 0.92 | 10 | none |
| 5 | 42 | 56 | 15 | do | 300 | 70 | 23 | | 12 | none |
| 6 | 42 | 56 | 15 | do | 300 | 35–40 | 9–12 | | 3–5 | none |
| 7 | 42 | 56 | 30 | do | 5 | 100 | 33 | | 25 | 23 |
| 8 | 42 | 56 | 15 | do | 300 | 100 | 24 | 0.922 | | 28 |
| 9 | 42 | 56 | 15 | do | 120 | 100 | 25 | 0.92 | | 25 |
| 10 | 42 | 56 | 15 | do | 30 | 100 | 21 | 0.92 | | 20 |
| 11 | 42 | 56 | 15 | do | 5 | 100 | 13 | 0.92 | | 18 |
| 12 | 42 | 56 | 15 | do | 300 | 70 | 5–7 | | | 5–7 |
| 13 | 42 | 56 | 15 | do | 120 | 35–40 | 4–5 | | | 4–5 |

The difference in technique required when active olefins, such as isoamylene, and relatively inactive olefins, such as octene-1, are used as alkylating agents in the presence of 90 to 96 per cent sulfuric acid can be accounted for by the following. When octene-1 is the alkylating agent, a far better product both from the standpoint of high yield of alkylthiophenes and low yield of resins is obtained when the concentrated sulfuric acid catalyst is dissolved in the olefin prior to the introduction of the thiophene. Essentially it is the octyl sulfate that is the catalyst in this case. It appears that in the presence of such a sulfate at elevated temperatures the rate of alkylation of the thiophene with the octene-1 is greater than the rate of polymerization of either reactant. However, when the acid is added to the mixture of thiophene and octene-1, it probably reacts with both at a similar rate. Upon heating, the part of the thiophene that has reacted with the acid is polymerized and decomposed and very likely promotes other side reactions. Examples XI and XII show that aliphatic sulfates do catalyze the alkylation of thiophene with olefins. If isoamylene is the alkylating agent, a considerable quantity of olefin and thiophene polymers and practically no alkyl thiophenes are produced if the concentrated sulfuric acid in small amounts is added to the olefin prior to the introduction of the thiophene. It appears that upon addition of the acid to the isoamylene, polymers are formed in which the acid is substantially insoluble. Thiophene, upon addition to this two-phase system, comes in contact with the concentrated acid and is polymerized, sulfonated, etc., at a much greater rate than it is alkylated with the isoamylene polymer. When the acid is added to the mixture of thiophene and isoamylene, the rate of alkylation of thiophene with the active olefin is so great that polymerization of the olefin and of the thiophene is reduced to a relatively small percentage.

EXAMPLE XI

To a well agitated mixture of 42 grams (0.5 mole) of thiophene and 40 grams (0.57 mole) of isoamylene were added slowly 14 grams of isopropyl sulfate at 25–30 degrees centigrade. The isopropyl sulfate was prepared by passing 22 grams (0.525 mole) of propylene into 50 grams (0.49 mole) of 96 per cent sulfuric acid at 0–10 degrees centigrade. When practically all of the isopropyl sulfate had been added, the reaction suddenly commenced. The temperature reached 70 degrees centigrade before it could be controlled by cooling; the recovery was washed and distilled. The following cuts were taken over a one-plate column:

| | | | |
|---|---|---|---|
| 70–120° C | 19 grams | Thiophene | |
| 150–205° C | 30 grams | Amylthiophene and amylene polymers (Sp. Gr.=0.900) | |
| Residue | 32 grams | Diamylthiophene (Sp. Gr.=0.939) | |

EXAMPLE XII

To 15 grams of 96 per cent sulfuric acid (0.147 mole) were added slowly 30 grams (0.268 mole) of octene-1 at 10–30 degrees centigrade. After the acid was completely in solution, the mixture of sulfates was added to 42 grams of thiophene and stirred at 40–45 degrees centigrade. About 52 grams (0.925 mole) of isobutylene were bubbled into this mixture in the course of 2 hours. The recovery was washed and distilled as previously described. The following cuts were taken over a one-plate column:

| | | |
|---|---|---|
| 70–140° C | 33 grams | Octene-1 and thiophene |
| 150–200° C | 11 grams | |
| 200–250° C | 60 grams | Dibutylthiophene (Sp. Gr.=0.915) |

The use of glacial acetic acid as a diluent for the sulfuric acid has been found to be effective (see Example XIII).

EXAMPLE XIII

To a well agitated mixture of 42 grams of thiophene and 56 grams (0.5 mole) of octene-1 were added slowly a solution of 15 grams (0.147 mole) 96 per cent sulfuric acid in 6 grams of glacial acetic acid. The reaction temperature was kept at 100–110 degrees centigrade through the 2.5 hour run. The recovery was washed and distilled as previously described. Recovered 33 grams (specific gravity=0.920) of octyl- and, possibly, dioctylthiophenes boiling from 75–130 degrees centigrade at 3 millimeters mercury. Also recovered 15 grams of a viscous, benzene-soluble residue. No resinous sludge was formed.

EXAMPLES XIV, XV, AND XVI

Butylthiophenes were prepared as follows: About 1.1 moles (61 grams) of isobutylene were charged through a flowmeter during about 65 minutes into about 1 mole (84 grams) of thiophene and the 75 per cent sulfuric acid in a three-neck flask equipped with a thermometer, a stirrer, a reflux condenser and cooling bath. The temperature was kept below about 80 degrees centigrade. After each run the product was separated from the catalyst, water-washed and distilled. The catalyst from Example XIV was reused in Example XV without notable decrease in its catalytic activity. Much less catalyst was used in Example XVI without excessive reduction in yield and conversion per pass. Higher temperatures and rates of addition of olefin can be used with lower acid concentrations, and pressures greater than atmospheric. The data obtained from these runs are collected in Table V.

TABLE V

*Alkylation of thiophene with isobutylene catalyzed by 75% $H_2SO_4$*

| Example No. | XIV | XV | XVI |
|---|---|---|---|
| Temperature (° C.) | 70–80 | 70–80 | 70–80 |
| Run Duration (Min.) | 65 | 65 | 65 |
| Catalyst: | | | |
|   Weight per cent of Charge | 14 | 14 | 3.3 |
|   No. of Recycles | Fresh | 1 | Fresh |
| Charge: | | | |
|   Thiophene (g.) | 84 | 84 | 84 |
|   Isobutylene (g.) | 63±2 | 60±2 | 60±2 |
| Ratio of Thiophene to Isobutylene: | | | |
|   Weight | 1.33 | 1.4 | 1.4 |
|   Molar | 0.9 | 0.9 | 0.9 |
| Recovered Thiophene: | | | |
|   Wt. per cent of Thiophene Charged | 24 | 31 | 33.5 |
|   Wt. per cent of Total Charge | 14 | 16 | 19 |
| Reaction Products (Wt. per cent of Charge): | | | |
|   Crude t-butylthiophene | 61 | 58 | 52 |
|   Crude di-t-butylthiophene | 18 | 19 | 20 |
|   Residue | 3 | 4 | 3 |
| Washing and Distillation Losses (Wt. per cent of Charge) | 4 | 3 | 1 7 |
| Conversion per Pass to Alkylthiophenes (Wt. per cent of Charge) | 79 | 77 | 72 |
| Ultimate Yield of Alkylthiophenes (Based on Thiophene) | 92 | 92 | 89 |

[1] Includes some isobutylene losses.

EXAMPLE XVII

Amylthiophenes were produced in a manner substantially the same as that used to produce the butylthiophenes. The results are shown in Table VI.

TABLE VI

*Alkylation of thiophene with mixed amylenes catalyzed by 75% $H_2SO_4$*

| | |
|---|---|
| Example No. | XVII |
| Temperature (°C.) | 65–75 |
| Run duration (min.) | 65 |
| Catalyst: | |
|   Weight percent of charge | 37 |

Charge:
- Thiophene (g.) .................. 42
- Mixed amylenes (g.) ............. 70
- Isopentene (g.) ................. 35

Ratio of thiophene to isopentene:
- Weight .......................... 1.2
- Molar ........................... 1

Recovered n-pentenes and n-pentane (g.) ... 36

Recovered thiophene:
- Wt. percent of thiophene charged .... 19
- (Wt. percent of total charge) ...... 10

Reaction Products (wt. percent of charge):
- Crude t-amylthiophene ............. 51
- Crude di-t-amylthiophene .......... 21
- Residue ........................... 4

Washing and distillation losses (wt. percent of charge) ................. 7

Conversion per Pass to alkylthiophenes (wt. of charge) ............... 79

Ultimate yield of alkylthiophenes (based on thiophene) ................. 88

The material balance in this run was based on the assumptions that the Sharples mixed amylenes contained 50 per cent isopentenes and that the n-pentenes did not react under these conditions. Analyses of similar amylene stocks have shown their composition to be:

| | Percent |
|---|---|
| Isopentenes | 45-47 |
| n-Pentenes | 45-47 |
| n-Pentane | 6-10 |

If the material balance were based on mixed amylenes containing 45 per cent isopentenes, the conversion per pass and ultimate yield would be 84 per cent and 95 per cent, respectively. By the use of higher pressures such as three to five atmospheres the conversion could be increased.

The foregoing clearly establishes that when relatively inactive alkylating agents are employed in the presence of 90 to 96 per cent sulfuric acid, far better results are obtained when the acid is dissolved in the alkylating agent prior to the addition of the thiophene. In other words, in this sequence of operations the catalyst is the aliphatic sulfate. Accordingly, aliphatic sulfates are catalysts for the alkylation of thiophene and alkylthiophenes. Furthermore, diluents other than glacial acetic acid such as primary alcohols may be used.

Thus, although the present invention has been described in conjunction with certain illustrative but not limiting examples, those skilled in the art will understand that certain broad principles have been illustrated, to wit: thiophene and alkylthiophenes can be alkylated in the presence of 45 per cent or stronger sulfuric acid at autogenous pressure at temperatures up to about 300 degrees centigrade employing olefins, alcohols, alkyl halides, alkyl sulfates, mercaptans, aralkyl halides, organic and inorganic esters, ethers, alkene oxides and the like and, in general, all of the conventional alkylating agents; thiophene and alkylthiophenes can be alkylated employing the afore-enumerated alkylating agents in the presence of aliphatic sulfates as catalysts at temperatures up to about 300 degrees centigrade and at autogenous pressures; when alkylating thiophene and alkylthiophenes employing highly branched-chain olefins as alkylating agents olefins having up to 24 carbon atoms or more can be used; when employing straight chain olefins with the double bond in the 1 position, hydrocarbons having 2 to 8 to 16 carbon atoms can be used although it is preferred to use olefins of this type having 3 to 16 carbon atoms; when using tertiary alcohols as alkylating agents those having up to 24 or even 30 carbon atoms may be used; that as the concentration of the sulfuric acid is lowered the reaction temperature is increased; that sulfuric acid can be used in varying amounts of from about one-tenth to seven-tenths or more on a molecular weight basis of the alkylating agent or the thiophene or alkylthiophene. Thus, broadly stated, it has been shown that thiophene and alkylthiophenes can be alkylated with conventional alkylating agents in the presence of an alkylation catalyst selected from the group aliphatic sulfates and sulfuric acid of from about 45 per cent to about 98 per cent concentration with water or acetic acid as a diluent at temperatures of about zero degrees to about 300 degrees centigrade at autogenous pressures to produce alkylthiophenes or polyalkylthiophenes.

We claim:

1. A method for synthesizing the homologues of thiophene having at least one nuclear hydrogen replaced by an alkyl group which comprises reacting a thiophene compound having at least one hydrogen of the thiophene nucleus replaceable with an alkylating agent in the presence of an aqueous solution of sulfuric acid of about 45 to about 75 per cent concentration at temperatures of about 55° to about 300° C., the lower the concentration of sulfuric acid in said solution of sulfuric acid the higher the reaction temperature.

2. A method for synthesizing the homologues of thiophene having at least one nuclear hydrogen replaced by an alkyl group which comprises reacting a thiophene compound having at least one hydrogen of the thiophene nucleus replaceable with an alkylating agent in the presence of concentrated sulfuric acid and sufficient of a non-reactant diluent of the class consisting of water and acetic acid to provide a solution of sulfuric acid having a concentration of about 45 to about 75 per cent at temperatures of about 55° to about 300° C., the lower the concentration of sulfuric acid in said solution of sulfuric acid the higher the reaction temperature.

3. The process as set forth and described in claim 2 wherein the diluent is acetic acid.

4. The process as set forth and described in claim 1 wherein the alkylating agent is a straight chain olefin having 2 to 16 carbon atoms in the chain and the double bond in the one position.

5. The process as set forth and described in claim 1 wherein the alkylating agent is a branched-chain olefin having up to 30 carbon atoms.

6. The process as set forth and described in claim 1 wherein the alkylating agent is a tertiary alcohol.

7. The process as set forth and described in claim 1 wherein the molal ratio of alkylating agent to sulfuric acid is about 1.4.

8. The process as set forth and described in claim 1 wherein the molal ratio of alkylating agent to sulfuric acid is about 9 to about 10 to 1.

9. The process as set forth and described in claim 1 wherein the sulfuric acid is of 75 to 80 per cent concentration.

10. The process as set forth and described in claim 1 wherein the alkylating agent is a branched-chain olefin having 4 to 8 carbon atoms and the reaction temperature is about 60 to about 150 degrees centigrade.

11. The process as set forth and described in claim 1 wherein the alkylating agent is a straight chain olefin having 3 to 8 carbon atoms.

PHILIP D. CAESAR.
PHAREZ G. WALDO.

REFERENCES CITED

The following references are of record in the file of this patent:

UNITED STATES PATENTS

| Number | Name | Date |
|---|---|---|
| 2,141,611 | Malishev | Dec. 27, 1938 |
| 2,396,144 | Anderson | Mar. 5, 1946 |
| 2,429,575 | Appleby | Oct. 21, 1947 |

OTHER REFERENCES

Morton, "The Chemistry of Heterocyclic Compounds," pages 39, 40; McGraw-Hill, N. Y., 1946.

Steinkopf, "Die Chemie des Thiophens," p. 19; Dresden, 1941, Edwards Lithoprint, 1944.

Certificate of Correction

September 20, 1949

Patent No. 2,482,084

PHILIP D. CAESAR ET AL.

It is hereby certified that error appears in the printed specification of the above numbered patent requiring correction as follows:

Columns 7 and 8, Table IV, fifth column thereof, Run No. 8, for "do" read *to mixture*;
and that the said Letters Patent should be read with this correction therein that the same may conform to the record of the case in the Patent Office.

Signed and sealed this 9th day of May, A. D. 1950.

[SEAL]

THOMAS F. MURPHY,
*Assistant Commissioner of Patents.*